US008807577B2

(12) United States Patent
Lai (10) Patent No.: US 8,807,577 B2
(45) Date of Patent: Aug. 19, 2014

(54) SKATEBOARD ASSEMBLY AND SKATEBOARD HAVING THE SAME

(71) Applicant: Po-Chih Lai, Kaohsiung (TW)

(72) Inventor: Po-Chih Lai, Kaohsiung (TW)

(73) Assignee: Stair-Rover Limited, London (GB)

( * ) Notice: Subject to any disclaimer, the term of this patent is extended or adjusted under 35 U.S.C. 154(b) by 0 days.

(21) Appl. No.: 13/740,528

(22) Filed: Jan. 14, 2013

(65) Prior Publication Data

US 2014/0197611 A1 Jul. 17, 2014

(51) Int. Cl.
*A63C 17/01* (2006.01)
*A63C 17/04* (2006.01)
*B62M 1/00* (2010.01)

(52) U.S. Cl.
CPC ........................................ *B62M 1/00* (2013.01)
USPC ................................... 280/11.28; 280/87.042

(58) Field of Classification Search
USPC ................... 280/11.27, 11.28, 87.01, 87.041, 280/87.042
See application file for complete search history.

(56) References Cited

U.S. PATENT DOCUMENTS

| | | | | | |
|---|---|---|---|---|---|
| 4,062,557 | A | * | 12/1977 | Roden | 280/87.042 |
| 4,230,330 | A | * | 10/1980 | Muhammad | 280/87.042 |
| 4,645,223 | A | * | 2/1987 | Grossman | 280/11.28 |
| 6,158,753 | A | * | 12/2000 | Sturbaum | 280/87.042 |
| 6,182,987 | B1 | * | 2/2001 | Bryant | 280/87.042 |
| 8,186,694 | B2 | * | 5/2012 | Nelson et al. | 280/11.28 |
| 2003/0141688 | A1 | * | 7/2003 | Lynn | 280/87.042 |

* cited by examiner

*Primary Examiner* — John Walters
(74) *Attorney, Agent, or Firm* — Ming Chow; Sinorica, LLC (57) ABSTRACT

A skateboard assembly and a skateboard having the same are provided. The skateboard assembly includes a truck and a frame. The truck includes a pivot that has two oppositely extending axial sections, and the frame includes a pivot hole, and a first segment and a second segment extending at two sides of the pivot hole, wherein the first segment and the second segment include an angle and each of the first and second segments has an end far from the pivot hole provided with an axle.

20 Claims, 6 Drawing Sheets

SKATEBOARD ASSEMBLY AND SKATEBOARD HAVING THE SAME

FIELD OF THE INVENTION

The invention relates to skateboard assembly and skateboard having the same.

BACKGROUND OF THE INVENTION

The conventional skateboard is composed of a deck, a baseplate, trucks having through holes, kingpins passing through the through holes of the trucks so as to fix the trucks to the baseplate, buffering members each provided between the kingpin and the through hole, and wheels rotatably connected to ends of the two trucks.

The conventional skateboard is designed to slide on even roadways. While the provision of the buffering members facilitates veer of the skateboard, they cannot help skateboard to slide on uneven roadways, not to mention stairs.

Hence, it would be a task for related manufacturers to address to provide a skateboard assembly and a skateboard having the assembly, so as to allow users to skateboard on uneven roadways, and particularly, stairs.

SUMMARY OF THE INVENTION

In order to solve the foregoing drawbacks of the conventional technology, the present invention provides a skateboard assembly comprising: a truck, including a pivot that has two oppositely extending axial sections; and a frame, including a pivot hole, and a first segment and a second segment extending at two sides of the pivot hole, wherein the first segment and the second segment include an angle and each of the first and second segments has an end far from the pivot hole provided with an axle.

In one aspect, the skateboard assembly further comprising wheels each rotatably mounted around the axle of the first segment and of the second segment.

In one aspect, the truck further comprises a first through hole, and the skateboard assembly further comprises: a baseplate that includes a first mounting hole; a kingpin that extends from one side of the baseplate; and a first fastening member, wherein, the kingpin passes through the first through hole and gets engaged with the first fastening member so as to fixedly combine the truck with the baseplate.

In one aspect, the skateboard assembly further comprising a first buffering member, which is mounted around the kingpin, wherein the kingpin has a sectional area smaller than a diameter of the first through hole, and the first buffering member is at least partially received in a gap formed between the kingpin and the first through hole.

In one aspect, the skateboard assembly further comprising: a jointing member, including a second through hole and a third through hole, wherein the second through hole is parallel to the first through hole, and the third through hole is formed at an end of the jointing member far from the second through hole; a keel, having a fourth through hole parallel to the third through hole; and a second fastening member, wherein, the kingpin passes through the first through hole and the second through hole, and the jointing member is fixed to the truck through the first fastening member, and wherein the second fastening member passes through the third through hole and the fourth through hole, so as to affix the keel to the truck through the jointing member.

In one aspect, the third through hole has a diameter greater than a sectional area of the second fastening member.

In one aspect, the third through hole has a middle part defined by two flat walls that are parallel to each other and separated by a distance equal to or slightly greater than a width of the sectional area of the second fastening member, with two ends of the third through hole each defined by an arc.

In one aspect, the keel includes at least two lengthwise plates, and each said lengthwise plate has each of two ends thereof formed with the fourth through hole, while the corresponding fourth through holes of the two lengthwise plates are aligned with the third through hole from two sides.

In one aspect, the pivot of the truck has two first retaining members each deposited between a middle part and an end of the pivot, and the frame has a side that faces the truck and has the pivot hole provided with a first positioning portion, and wherein the skateboard assembly further comprises two second retaining members each having a second positioning portion and a fifth through hole, so that the second positioning portion is engaged with the first positioning portion, and when the pivot passes through the fifth through hole and the pivot hole, the second retaining member is connected to the frame, so that contact between the first retaining member and the second retaining member defines a moving range of the frame.

In one aspect, the first retaining member is formed with a ramp facing the frame, and the second retaining member has a ramp facing the first retaining member and being parallel to the ramp of the first retaining member.

In one aspect, the second retaining member is made of nylon.

In one aspect, the pivot of the truck has two first retaining members each deposited between a middle part and an end of the pivot, and the frame has a side that faces the truck and has the pivot hole provided with a third retaining member, so that when the pivot passes through the pivot hole, contact between the first retaining member and the third retaining member defines a moving range of the frame.

In one aspect, the skateboard assembly further comprising a second buffering member, which is deposited between the first retaining member and the second retaining member.

In one aspect, the first segment or the second segment of the frame has a cutout portion.

The present invention further provides a skateboard comprising: a truck, including a pivot that has two oppositely extending axial sections; a frame, including a pivot hole, and a first segment and a second segment extending at two sides of the pivot hole, wherein the first segment and the second segment include an angle and each of the first and second segments has an end far from the pivot hole provided with an axle; wheels, each rotatably mounted around the axle of the first segment and of the second segment; a baseplate that includes a first mounting hole; a kingpin that extends from one side of the baseplate; a first buffering member, which is mounted around the kingpin, wherein the kingpin has a sectional area smaller than a diameter of the first through hole, and the first buffering member is at least partially received in a gap formed between the kingpin and the first through hole; a first fastening member; a second fastening member; a deck, including a second mounting hole correspond to the first mounting hole; a jointing member, including a second through hole and a third through hole, wherein the second through hole is parallel to the first through hole, and the third through hole is formed at an end of the jointing member far from the second through hole; a keel, having a fourth through hole parallel to the third through hole; and a third fastening member, wherein, the kingpin passes through the first through hole and the second through hole and gets engaged with the first fastening member so as to fixedly combine the truck with the baseplate, and the second fastening member passes through the first mounting hole and the corresponding second mounting hole, so as to fixedly combine the baseplate with the deck, wherein, the jointing member is fixed to the truck through the first fastening member, and wherein the second fastening member passes through the third through hole and the corresponding fourth through hole, so as to affix the keel to the truck through the jointing member.

In one aspect, the pivot of the truck has two first retaining members each deposited between a middle part and an end of the pivot, and the frame has a side that faces the truck and has the pivot hole provided with a first positioning portion, and wherein the skateboard assembly further comprises two second retaining members each having a second positioning portion and a fifth through hole, so that the second positioning portion is engaged with the first positioning portion, and when the pivot passes through the fifth through hole and the pivot hole, the second retaining member is connected to the frame, so that contact between the first retaining member and the second retaining member defines a moving range of the frame.

In one aspect, the first retaining member is formed with a ramp facing the frame, and the second retaining member has a ramp facing the first retaining member and being parallel to the ramp of the first retaining member.

In one aspect, the pivot of the truck has two first retaining members each deposited between a middle part and an end of the pivot, and the frame has a side that faces the truck and has the pivot hole provided with a third retaining member, so that when the pivot passes through the pivot hole, contact between the first retaining member and the third retaining member defines a moving range of the frame.

In one aspect, the skateboard further comprising a second buffering member, which is deposited between the first retaining member and the second retaining member.

In one aspect, the first segment or the second segment of the frame has a cutout portion.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

In the following description, for purposes of explanation, specific numbers, materials and configurations are set forth in order to provide a thorough understanding of the present invention. However, it will be apparent to one of ordinary skill in the art that the present invention may be practiced without specific details. In other instances, well-known systems are shown in diagrammatic or block diagram form in order not to obscure the present invention.

Figure 1:
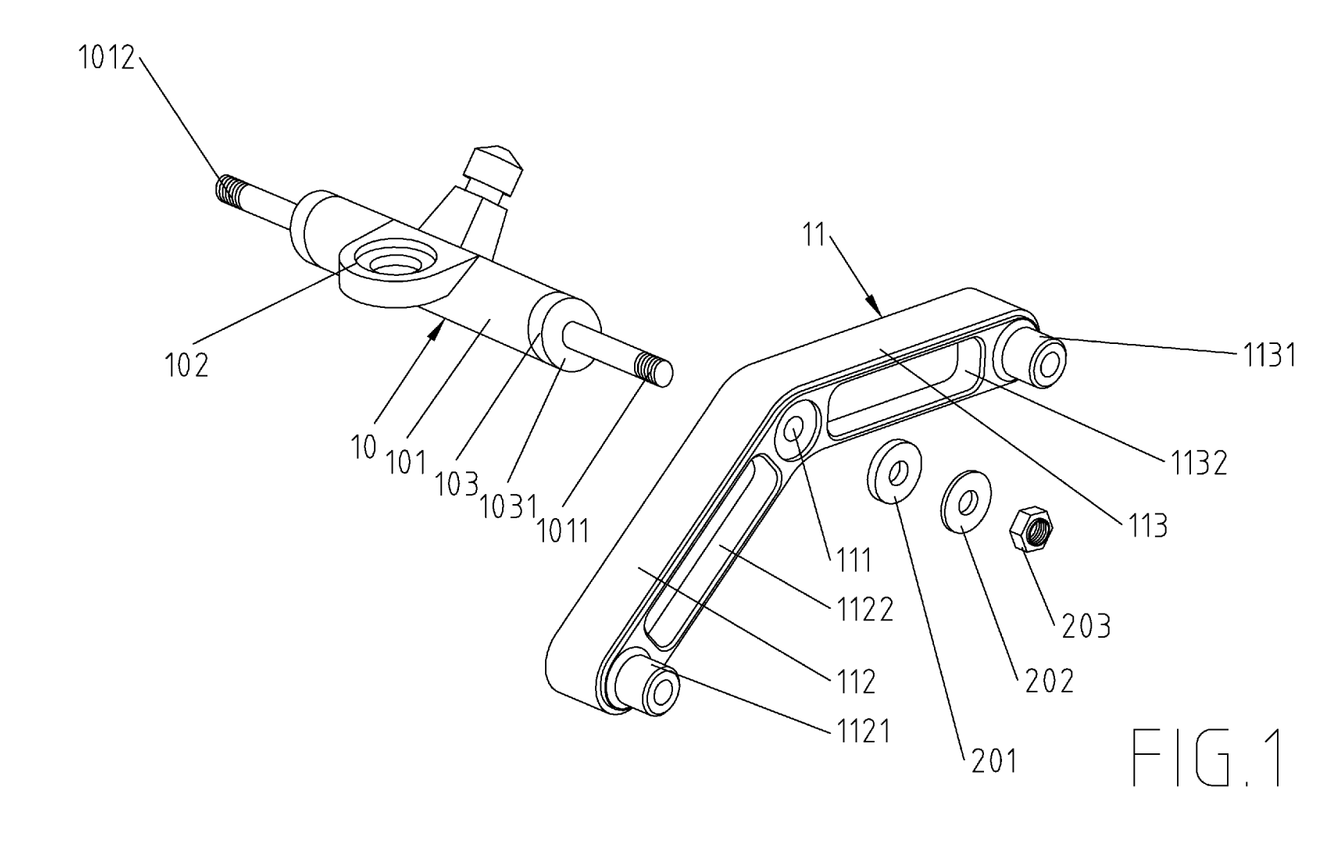
FIG. 1 is an explosion drawing of one embodiment of the skateboard assembly of the present invention.

Referring to FIG. 1, according to the present invention, a skateboard assembly comprises a truck 10 and a frame 11. The truck 10 includes a pivot 101 that has a first axial section 1011 and a second axial section 1012 extending oppositely. Preferably, the first axial section 1011 and the second axial section 1012 each have a retaining member 103. The retaining member 103 is configured to limit the rotating range of the frame 11 about the truck 10.

The frame 11 includes a pivot hole 111. The pivot hole 111 is preferably located in the middle part of the frame 11, but can be located alternatively on different sites in the frame 11 as required. The frame 11 has a first segment 112 and a second segment 113 extending at two sides of the pivot hole 111. The first segment 112 and the second segment 113 include an angle. Preferably, the frame 11 forms an included angle that is smaller than 180 degrees, such as an included angle of 170 degrees or 160 degrees, and faces the ground on which the wheel is placed, so that the frame 11 is V-shaped.

The first segment 112 and the second segment 113 each have their ends far from the pivot hole 111 provided with a first axle 1121 or a second axle 1131. Each of the first axle 1121 and the second axle 1131 is configured to receive a wheel rotating thereabout.

The first axial section 1011 and the second axial section 1012 may have their outer ends threaded. The frames 11 are mounted around the first axial section 1011 and the second axial section 1012 of the truck 10 through their pivot holes 111, and pivotally retained on the truck 10 from detachment by means of, for example, a combination of a rubber-made elastic member 201, a wash 202 and a nut 203.

The truck 10 and the frame 11 may be made of metal, such as aluminum or stainless steel. Alternatively, they can be made of fiberglass or nylon.

For minimizing the weight of the assembly, the first segment 112 and/or the second segment 113 of the frame 11 may optionally include a cutout portion 1122 and/or 1132. By hollowing out the first segment 112 and/or the second segment 113, the frame 11 and therefore the whole skateboard are lightened.

The skateboard typically uses two tandem arranged trucks 10, and each of the trucks 10 has its first and second axial sections 1011, 1012 pivotally connected to two frames 11, respectively. It is to be noted that for the sake of illustrative clarity, the following description is directed to the components and configuration of one of these frame 11 only.

With the combination of the trucks 10 and the frames 11 as mentioned previously, when a user skateboards the disclosed skateboard on even an uneven roadway, the frames 11 can adapt the skateboard to the uneven roadway, and reduce vibration, thereby ensuring the skateboard to move smoothly.

Figure 2:
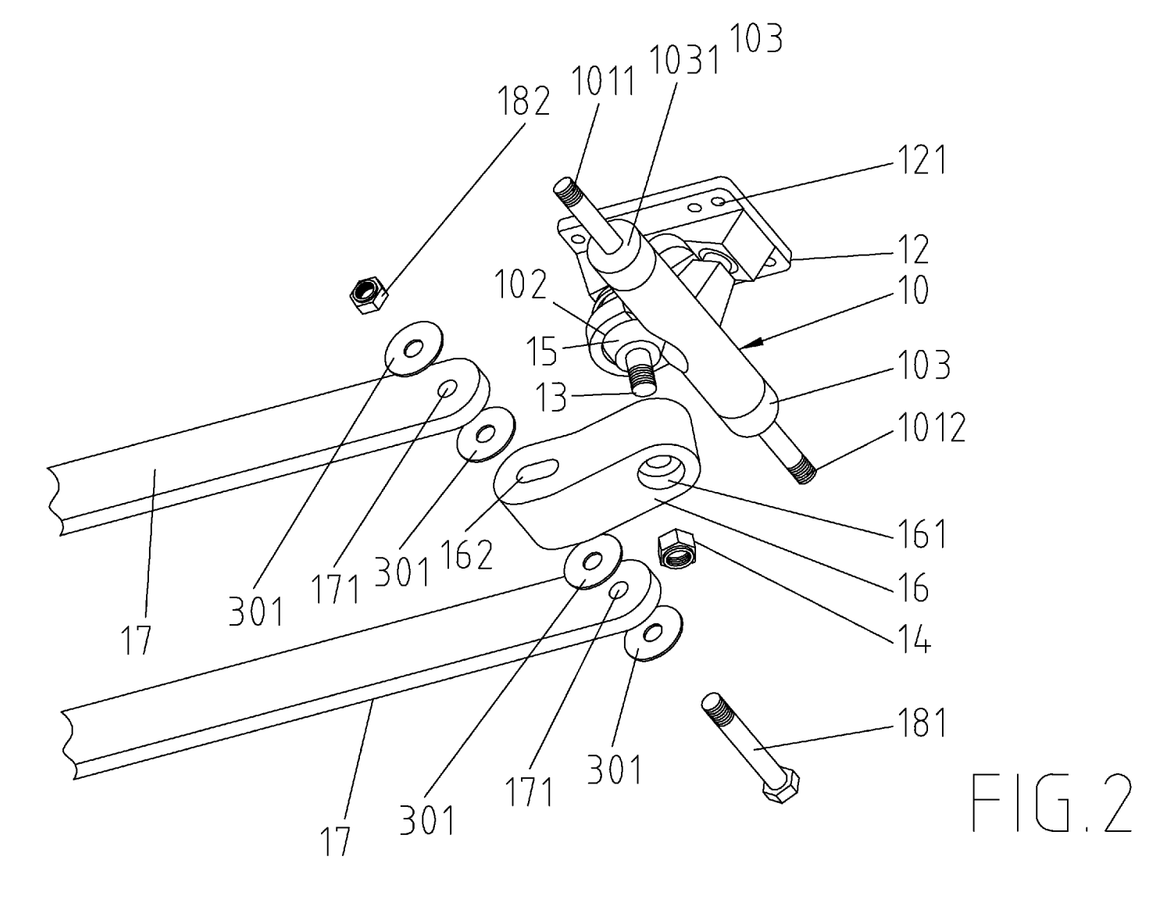
FIG. 2 is an explosion drawing of another embodiment of the skateboard assembly of the present invention.

Referring to FIG. 2, in the disclosed skateboard assembly, for each said truck 10, there may be a baseplate 12, a kingpin 13, a fastening member 14 and a buffering member 15 provided. The truck 10 may further include a through hole 102. The kingpin 13 passes through the through hole 102 and then gets engaged with the fastening member 14 so as to fix the truck 10 to the baseplate 12. The baseplate 12 is formed with a plurality of through holes 121, through which fasteners, such as screws, can pass so as to fix the baseplate 12 together with the truck 10 and the frames 11 to the deck of the skateboard. The buffering member 15 is received in the through hole 102 and mounted around the kingpin 13. More particularly, the kingpin 13 has a sectional area smaller than a diameter of the through hole 102, and the buffering member 15 has at least a part received in a gap formed between the kingpin 13 and the through hole 102. The buffering member 15 located between the kingpin 13 and the through hole 102 may be made of, for example, rubber and is designed for allowing that when the user applies a relatively large force at either side of the skateboard, the skateboard together with the baseplate 12 and the kingpin 13 affixed thereto can lean toward the force-receiving side, thereby cause the skateboard to veer.

Still referring to FIG. 2, the disclosed skateboard assembly may optionally include a jointing member 16, a keel 17 and fastening members 181, 182. The jointing member 16 comprises a through hole 161 and another through hole 162. The through hole 161 is parallel to the through hole 102 of the truck 10, and the through hole 162 is located at the end of the jointing member 16 far from the through hole 161. The through hole 162 and the through hole 161 may be such formed that they extends orthogonally. For example, through hole 161 is perpendicular to the axis of the truck 10, while the through hole 162 is parallel to the axis of the truck 10.

The keel 17 has a through hole 171 parallel to the through hole 162. It is to be noted that, in the present embodiment, two said trucks 10, two said jointing members 16 and two said keel 17 are provided for the two tandem trucks 10 and their frames 11. The two jointing members 16 are such arranged that their ends having the through holes 162 face each other under the skateboard. In addition, preferably, each skateboard has two keels 17 flanking the two jointing members 16. Each of the keels 17 has its two ends formed with through holes 171 aligned with the two through holes 162 of the tandem jointing members 16. The keel 171 is preferably in the form of a lengthwise plate.

More particularly, in the depicted embodiment, the fastening members include a screw 181 and a nut 182, wherein the screw 181 passes through the through holes 171 of the two keels 17 and four through holes 171 formed in four washes 301 that come in pairs to flank the keels 17, and then gets engaged with the nut 182, so as to combine the keels 17 with the jointing member 16 and attach the keels 17 to the truck 10 through the jointing member 16.

Preferably, the through hole 162 has a diameter greater than a sectional area of the screw 181, so that the through hole 162 receives and allows the screw 181 to move therein. More preferably, as shown in FIG. 2, the through hole 162 has its middle part defined by two flat walls that are parallel to each other and separated by a distance equal to or slightly greater than a width of the sectional area of the screw 181, with two ends of the through hole 162 each defined by an arc.

The jointing members 16 and the keels 17 may be made of nylon.

It is to be noted that the keels 17 are designed to directly contact nosing or convexity when the user skateboards along stairs or on uneven roadways, and support the skateboard, so as to prevent the deck of the skateboard directly contacting the nosing or convexity. As the contacting area between the keels 17 and stair nosing is far smaller than the contacting area that otherwise would be formed between the deck and the stair nosing, the keels 17 are helpful to ensure smooth slide of the skateboard along stairs. The through hole 162 is designed to be larger than the fastening member (i.e. the screw 181) for providing extra space to offset the external force applied to the keels 17 that are contacting stair nosing.

Figure 3:
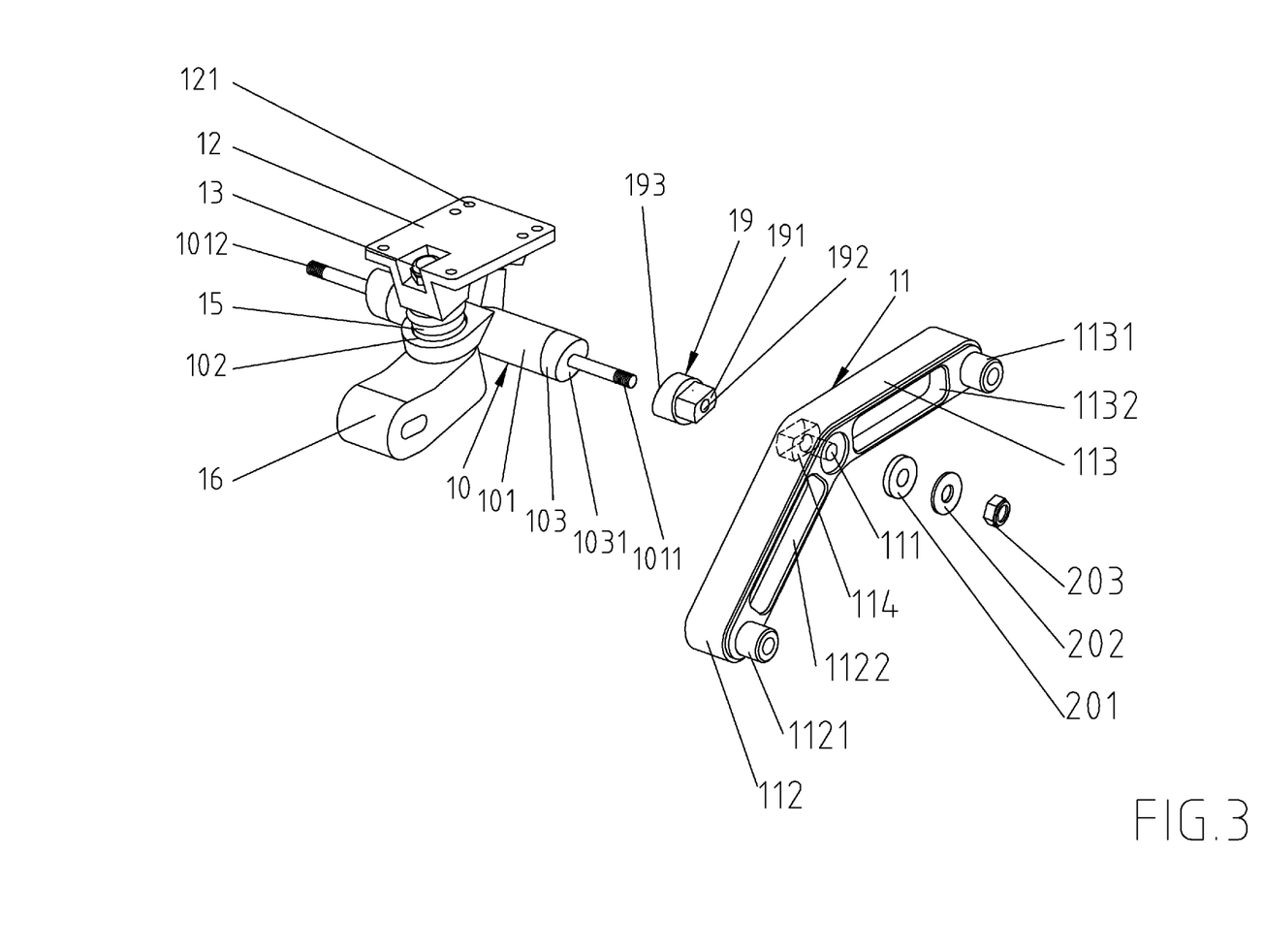
FIG. 3 is an explosion drawing of yet another embodiment of the skateboard assembly of the present invention.

Referring to FIG. 3, in another embodiment of the present invention, each of the first and second axial sections 1011, 1012 of pivot 101 on the truck 10 is provided with a retaining member 103. The retaining member 103 is deposited between the middle part and the end of the pivot 101. In addition, at the side of the frame 11 that faces the truck 10 and includes the pivot hole 111, there is a positioning portion 114 provided. Furthermore, the disclosed skateboard assembly further comprises retaining members 19 each located between one said the retaining member 103 and one said frame 11. The retaining member 19 has a positioning portion 191 and a through hole 192. The positioning portion 191 is configured to engage with the positioning portion 114. The pivot 101 passing through the through hole 192 and the pivot hole 111 makes the retaining member 19 and the frame 11 move in a mutually connected manner. Furthermore, the contact between the retaining member 103 and the retaining member 19 limits the moving range of the frame 11.

Preferably, the retaining member 103 has a ramp 1031 facing the frame 11, while the retaining member 19 has a ramp 193 facing the retaining member 103 and parallel to the ramp 1031 of the retaining member 103. More preferably, the retaining member 19 may be made of nylon. With the combination between the retaining member 19 and the frame 11, and the combination between the parallel ramps 1031, 193 of the retaining member 103 and the retaining member 19, when the skateboard moves on an uneven roadway or along stairs, the nylon-made retaining member 19 can restrict the frame 11 to swing within a certain range, thereby maintaining the steady contact between the skateboard wheels and the ground or stairs.

Figure 4:
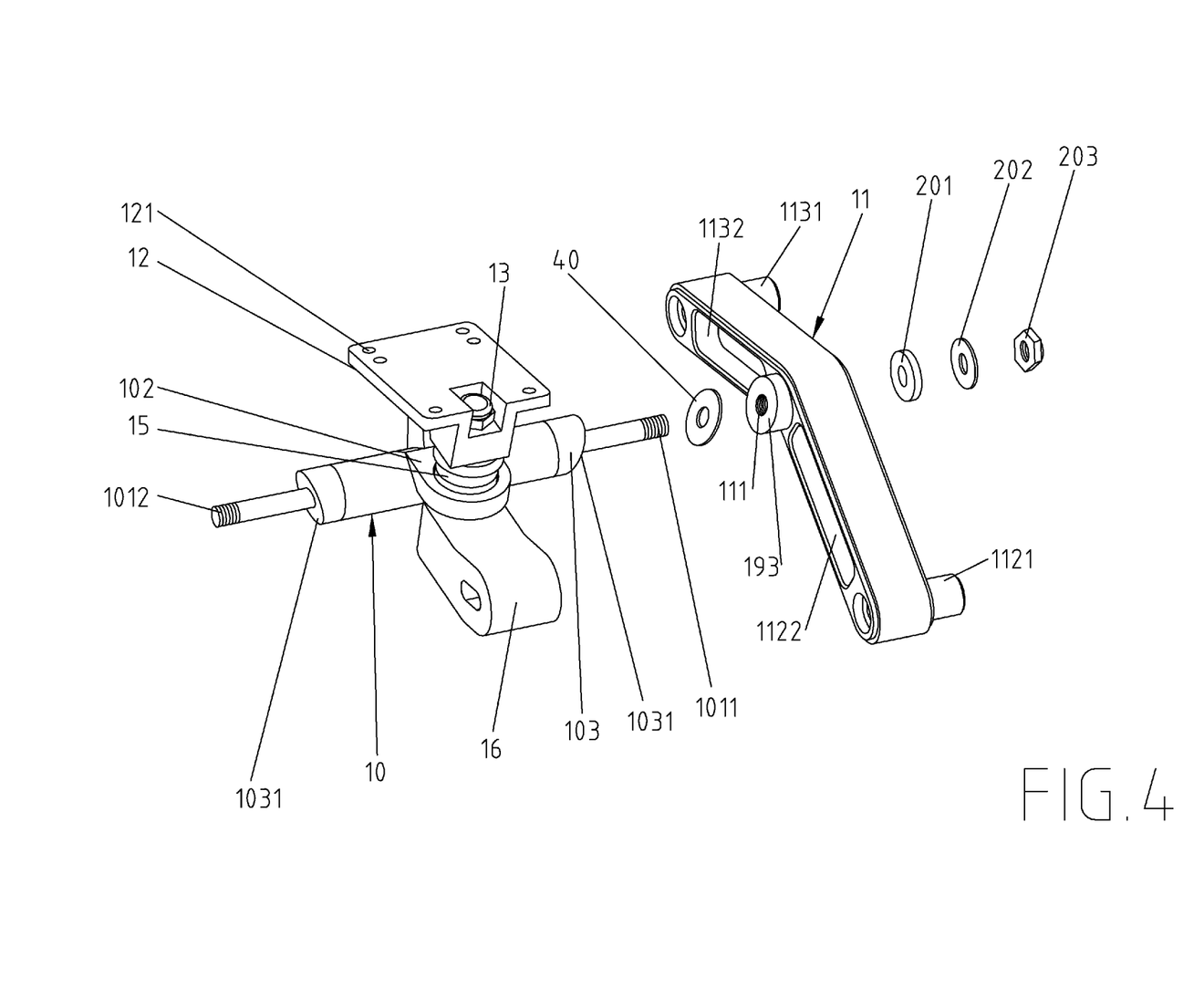
FIG. 4 is an explosion drawing of further another embodiment of the skateboard assembly of the present invention.

Referring to FIG. 4, in yet another embodiment of the present invention, a member like the ramp 193 of the retaining member 19 may be integratedly formed at the side of the frame 11 that faces the retaining member 103 of the truck 10 and has the pivot hole 111. What makes the present embodiment different from the foregoing embodiment is that a buffering member 40 made of nylon or made of rubber is deposited between the retaining member 103 and the ramp 193. Thereby, when the frame 11 swings as the skateboard moves on an uneven roadway or along stairs, the compressibility and elasticity of the buffering member 40 can restrict the frame 11 that is connected thereto to swing within a certain range, thereby maintaining the steady contact between the skateboard wheels and the ground or stairs.

Figure 5:
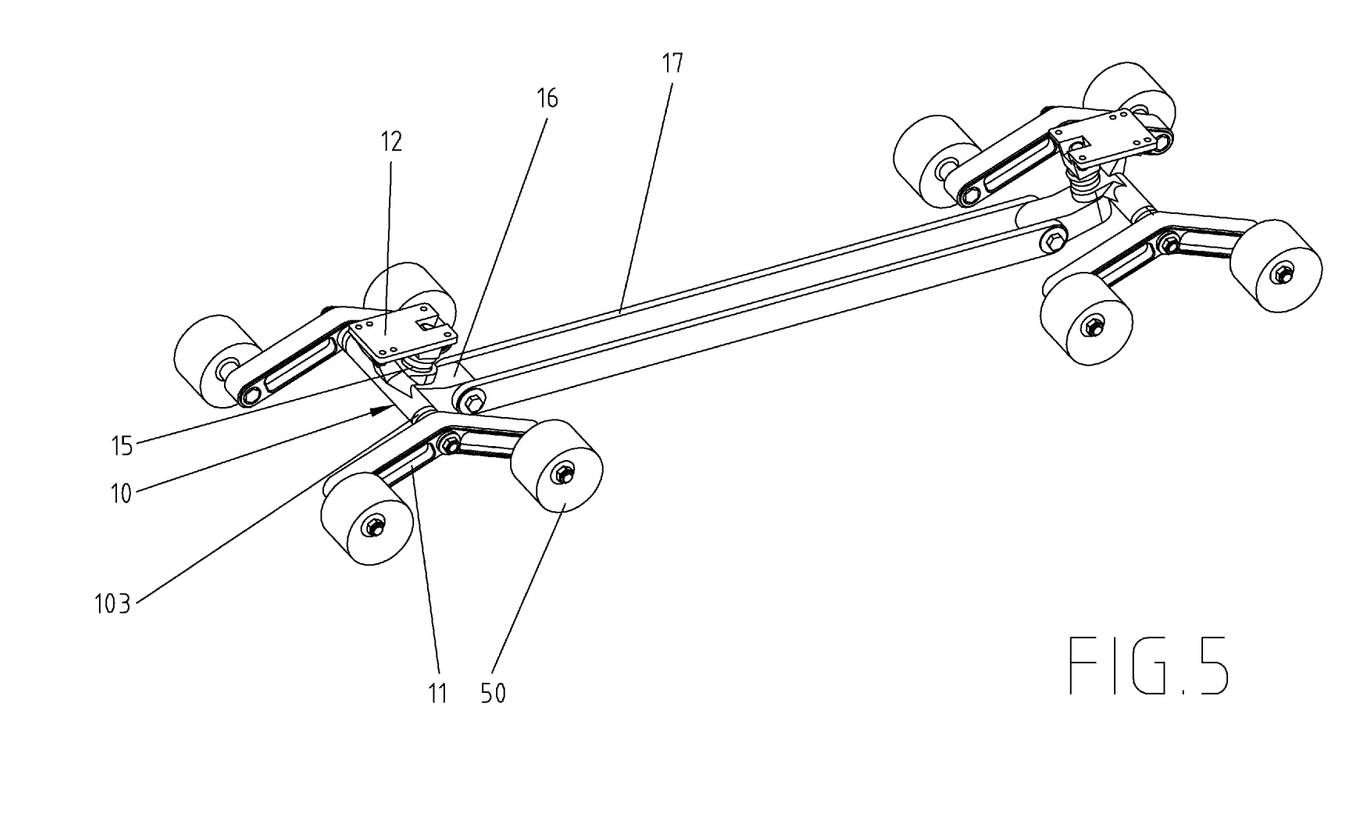
FIG. 5 is a schematic drawing shows structure of the disclosed assembly as described in the mentioned embodiments.

Referring to FIG. 5, a schematic drawing shows structure of the disclosed assembly as described in the mentioned embodiments. As shown, after the skateboard assembly is assembled, wheels 50 can be mounted on the first axles 1121 and the second axles 1131 on the frames 11 attached to the two tandem trucks 10.

Figure 6:
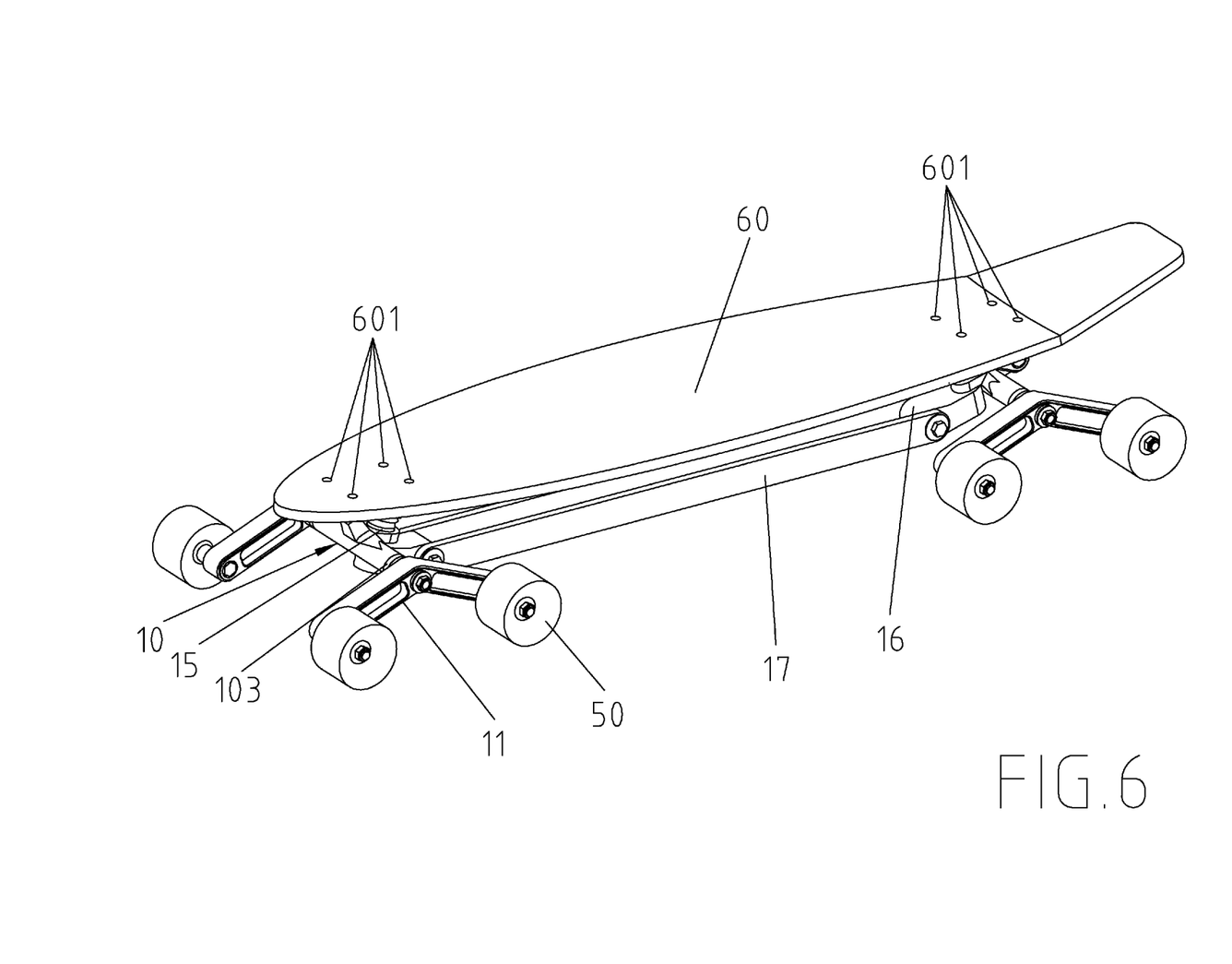
FIG. 6 is a schematic drawing shows a skateboard using the disclosed assemblies as described in the mentioned embodiments.

Referring to FIG. 6, a schematic drawing shows a skateboard using the disclosed assemblies. As shown, a deck 60 including a plurality of mounting holes 601. The plurality of mounting holes 601 are at least partially correspond to the plurality of through holes 121. By using screws or other fasteners to pass a plurality of through holes 121 and the corresponding mounting holes 601, the assembled structure of the present invention as shown in FIG. 5 can then be fixed to the deck 60 to form the skateboard of the present invention.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A skateboard assembly comprising:
    a truck, including a pivot that has two oppositely extending axial sections, wherein the pivot of the truck has two first retaining members each deposited between a middle part and an end of the pivot, and the frame has a side that faces the truck and has the pivot hole provided with a first positioning portion, and wherein the skateboard assembly further comprises two second retaining members each having a second positioning portion and a fifth through hole, so that the second positioning portion is engaged with the first positioning portion, and when the pivot passes through the fifth through hole and the pivot hole, the second retaining member is connected to the frame, so that contact between the first retaining member and the second retaining member defines a moving range of the frame; and a frame, including a pivot hole, and a first segment and a second segment extending at two sides of the pivot hole, wherein the first segment and the second segment include an angle and each of the first and second segments has an end apart from the pivot hole provided with an axle.

2. The skateboard assembly of claim 1, further comprising wheels each rotatably mounted around the axle of the first segment and of the second segment.

3. The skateboard assembly of claim 1, wherein the truck further comprises a first through hole, and the skateboard assembly further comprises:
a baseplate that includes a first mounting hole;
a kingpin that extends from one side of the baseplate; and
a first fastening member,
wherein, the kingpin passes through the first through hole and gets engaged with the first fastening member so as to fixedly combine the truck with the baseplate.

4. The skateboard assembly of claim 3, further comprising a first buffering member, which is mounted around the kingpin, wherein the kingpin has a sectional area smaller than a diameter of the first through hole, and the first buffering member is at least partially received in a gap formed between the kingpin and the first through hole.

5. The skateboard assembly of claim 4, further comprising:
a jointing member, including a second through hole and a third through hole, wherein the second through hole is parallel to the first through hole, and the third through hole is formed at an end of the jointing member apart from the second through hole;
a keel, having a fourth through hole parallel to the third through hole; and
a second fastening member,
wherein, the kingpin passes through the first through hole and the second through hole, and the jointing member is fixed to the truck through the first fastening member, and wherein the second fastening member passes through the third through hole and the fourth through hole, so as to affix the keel to the truck through the jointing member.

6. The skateboard assembly of claim 5, wherein the third through hole has a diameter greater than a sectional area of the second fastening member.

7. The skateboard assembly of claim 6, wherein the third through hole has a middle part defined by two flat walls that are parallel to each other and separated by a distance equal to or slightly greater than a width of the sectional area of the second fastening member, with two ends of the third through hole each defined by an arc.

8. The skateboard assembly of claim 5, wherein the keel includes at least two lengthwise plates, and each said lengthwise plate has each of two ends thereof formed with the fourth through hole, while the corresponding fourth through holes of the two lengthwise plates are aligned with the third through hole from two sides.

9. The skateboard assembly of claim 1, wherein the first segment or the second segment of the frame has a cutout portion.

10. The skateboard assembly of claim 1, wherein the first retaining member is formed with a ramp facing the frame, and the second retaining member has a ramp facing the first retaining member and being parallel to the ramp of the first retaining member.

11. The skateboard assembly of claim 1, wherein the second retaining member is made of nylon.

12. A skateboard assembly comprising:
a truck, including a pivot that has two oppositely extending axial sections, wherein the pivot of the truck has two first retaining members each deposited between a middle part and an end of the pivot, and the frame has a side that faces the truck and has the pivot hole provided with a third retaining member, so that when the pivot passes through the pivot hole, contact between the first retaining member and the third retaining member defines a moving range of the frame; and
a frame, including a pivot hole, and a first segment and a second segment extending at two sides of the pivot hole, wherein the first segment and the second segment include an angle and each of the first and second segments has an end apart from the pivot hole provided with an axle.

13. The skateboard assembly of claim 12, further comprising a second buffering member, which is deposited between the first retaining member and the second retaining member.

14. The skateboard assembly of claim 12, wherein the first segment or the second segment of the frame has a cutout portion.

15. A skateboard comprising:
a truck, including a pivot that has two oppositely extending axial sections;
a frame, including a pivot hole, and a first segment and a second segment extending at two sides of the pivot hole, wherein the first segment and the second segment include an angle and each of the first and second segments has an end apart from the pivot hole provided with an axle;
wheels, each rotatably mounted around the axle of the first segment and of the second segment;
a baseplate that includes a first mounting hole;
a kingpin that extends from one side of the baseplate;
a first buffering member, which is mounted around the kingpin, wherein the kingpin has a sectional area smaller than a diameter of the first through hole, and the first buffering member is at least partially received in a gap formed between the kingpin and the first through hole;
a first fastening member;
a second fastening member;
a deck, including a second mounting hole correspond to the first mounting hole;
a jointing member, including a second through hole and a third through hole, wherein the second through hole is parallel to the first through hole, and the third through hole is formed at an end of the jointing member apart from the second through hole;
a keel, having a fourth through hole parallel to the third through hole; and
a third fastening member,
wherein, the kingpin passes through the first through hole and the second through hole and gets engaged with the first fastening member so as to fixedly combine the truck with the baseplate, and the third fastening member passes through the first mounting hole and the corresponding second mounting hole, so as to fixedly combine the baseplate with the deck, wherein, the jointing member is fixed to the truck through the first fastening member, and wherein the second fastening member passes through the third through hole and the corresponding fourth through hole, so as to affix the keel to the truck through the jointing member.

16. The skateboard of claim 15, wherein the pivot of the truck has two first retaining members each deposited between a middle part and an end of the pivot, and the frame has a side that faces the truck and has the pivot hole provided with a first positioning portion, and wherein the skateboard assembly further comprises two second retaining members each having a second positioning portion and a fifth through hole, so that the second positioning portion is engaged with the first positioning portion, and when the pivot passes through the fifth through hole and the pivot hole, the second retaining member is connected to the frame, so that contact between the first retaining member and the second retaining member defines a moving range of the frame.

17. The skateboard of claim 16, wherein the first retaining member is formed with a ramp facing the frame, and the second retaining member has a ramp facing the first retaining member and being parallel to the ramp of the first retaining member.

18. The skateboard of claim 15, wherein the pivot of the truck has two first retaining members each deposited between a middle part and an end of the pivot, and the frame has a side that faces the truck and has the pivot hole provided with a third retaining member, so that when the pivot passes through the pivot hole, contact between the first retaining member and the third retaining member defines a moving range of the frame.

19. The skateboard of claim 18, further comprising a second buffering member, which is deposited between the first retaining member and the second retaining member.

20. The skateboard of claim 15, wherein the first segment or the second segment of the frame has a cutout portion.

* * * * *